United States Patent [19]

Abe et al.

[11] Patent Number: 5,281,157
[45] Date of Patent: Jan. 25, 1994

[54] CONNECTOR DEVICE FOR AN INFORMATION PROCESSING MEDIUM

[75] Inventors: Hiroshi Abe, Yokohama; Hiroshi Narita, Tokyo; Kenji Suzuki, Kawasaki, all of Japan

[73] Assignee: E. I. du Pont de Nemours & Company, Wilmington, Del.

[21] Appl. No.: 10,688

[22] Filed: Jan. 28, 1993

[30] Foreign Application Priority Data

Jan. 28, 1992 [JP] Japan .................... 4-2539[U]

[51] Int. Cl.⁵ .................................... H01R 13/00
[52] U.S. Cl. ................................................ 439/159
[58] Field of Search ........................... 439/152–160

[56] References Cited

U.S. PATENT DOCUMENTS

| | | | |
|---|---|---|---|
| 4,836,790 | 6/1989 | Narita | 439/159 |
| 4,952,161 | 8/1990 | Komatsu | 439/159 |
| 5,026,296 | 6/1991 | Hashiguchi | 439/159 |
| 5,051,101 | 9/1991 | Komatsu | 439/159 |

Primary Examiner—Joseph H. McGlynn
Attorney, Agent, or Firm—Woodcock Washburn Kurtz Mackiewicz & Norris

[57] ABSTRACT

A connector device is provided which can be made small and thin in a form as close to the external width dimension of an information processing medium per se as possible. A frame member for guiding an IC pack and connector section to be connected to the IC pack are mounted on a housing plate member. An ejection mechanism for the IC pack is incorporated on the housing plate member. The ejection mechanism is equipped with guide portion so as to operate the ejection mechanism. An operation unit is arranged in a width direction of the housing plate member so as to be slidable in a direction intersecting with that in which the IC pack is inserted and withdrawn. A stopper is provided in the width range of the housing plate member 2 such that it can prevent a movement of the slide plate member in the withdrawing direction and allows a movement of the operation unit in the withdrawing direction when the operation unit is released.

6 Claims, 4 Drawing Sheets

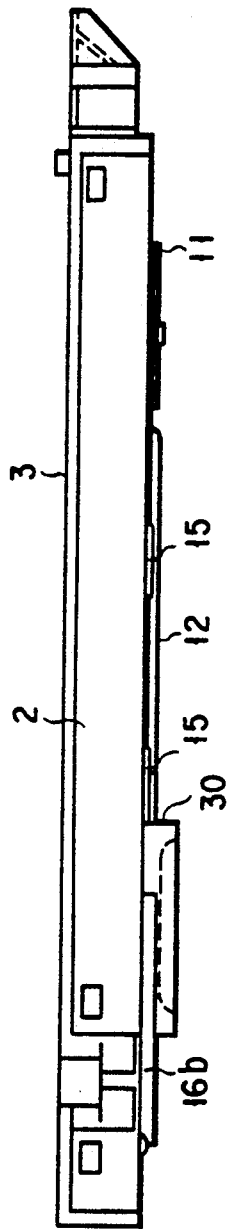
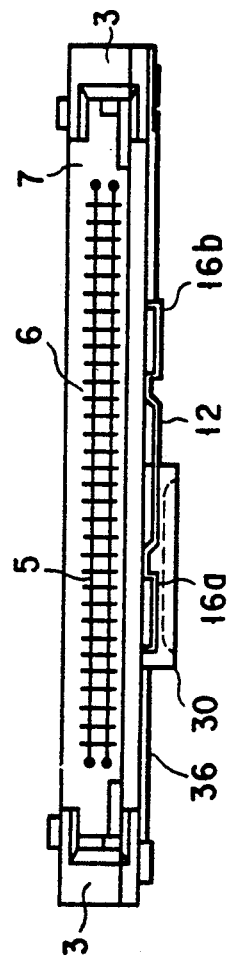
FIG. 3
FIG. 4

CONNECTOR DEVICE FOR AN INFORMATION PROCESSING MEDIUM

BACKGROUND OF THE INVENTION

1. Field of the Invention

The present invention relates to a connector device for an information processing medium and, in particular, to a connector device equipped with an ejecting mechanism whereby an information processing medium, such as memory cards, IC cords, floppy discs and hard discs, can be received relative to an electronic apparatus side, such as a personal computer, while being electrically connected to the electronic apparatus body side, and, when being in a non-operative state, can be electrically disconnected from the electronic apparatus body side so that the information processing medium can be withdrawn from a storage space (the electronic apparatus).

2. Description of the Related Art

In an electronic apparatus, such as a personal computer, a connector device has extensively been employed which, in order to extend an application range etc., enables an IC pack, such as a memory card and IC card, to be electrically mounted, as required, in the electronic apparatus body.

Such a connector device for the IC pack comprises an U-shaped frame having opposed right and left frame sections with a guide groove in an inner surface side of the respective frame section and an intermediate frame section provided between the right and left frame sections and having a plurality of pin terminals. A plate-like IC pack is inserted into the U-shaped frame via an open insertion inlet, while being moved along the respective guide grooves, and held in the frame with the pin terminals fitted into associated socket terminals of the IC pack for electrical connection.

When the IC pack is not used, it can be withdrawn, by an ejection mechanism, from a storage space to achieve an electrical disconnection. Generally, the ejection mechanism enables a plate-like lever member which has a hook engaged with a forward free end edge of the IC pack to be rotated about a pin fixed to the U-shaped frame so that the IC pack is withdrawn.

A recent tendency has been toward achieving an electronic apparatus as a compact and thin unit. Such a demand is also made for a connector device so that it can be received, as a compact and thin unit, in the electronic apparatus for electrical connection.

However, since the operation section of the lever member for IC pack ejection is projected from the side of the storage frame across the width of the frame, a resultant connector device becomes greater in the width direction of the connector. Further, there is a risk that, when the lever member of the ejection mechanism is rotated, the IC pack will be ejected from the storage space by an inadvertent operation of the ejection operation lever even if data is now reading out of the IC pack.

SUMMARY OF THE INVENTION

It is accordingly the object of the present invention to provide a connector device for an information processing medium which can be made simple in construction and compact in a width direction without the need for appreciably increasing the thickness of the connector device and small and thin in a form as close to the external width dimension of the information processing medium per se as possible and can know whether or not data is now being read out of the information processing medium, such as an IC pack, and can avoid an inadvertent ejection of the information processing medium to a minimal possible extent.

In order to achieve the aforementioned object of the present invention, a connector device is provided which is as set out below. In the connector device, a pair of parallel guide frame members are arranged relative to both opposed side of the housing plate member and have a distance substantially equal to the width of a plate-like information processing medium. By so doing, it is possible to guide the information processing medium in a direction in which it is inserted and withdrawn. A connector section is located at one end opposite to an insertion inlet side of the housing plate member where the information processing medium is inserted. The connector section has connection terminals which are electrically connected to the information processing medium. A slipout plate member is provided relative to the housing plate member and has engaging sections engaging with the front end portion of the information processing medium electrically connected to the connector section, so that the information processing medium can be withdrawn. The slipout plate member can be slidably moved in the direction in which the information processing medium is inserted and withdrawn. An ejection lever is pivotally supported on the housing plate member and has a first connection section at its forward free end and a second connection section provided at its intermediate section to allow a connection of the slipout plate member. A slide plate member is so mounted relative to the housing plate member as to be slidably along the direction in which the information processing medium is inserted and withdrawn. To this end, the slide plate member is connected to the first connection section of the ejection lever. A slidable operation unit is arranged in a width range of the housing plate member and adapted to be slidably moved along a guide area in the slide plate member in a direction different from that in which the information processing medium is inserted and withdrawn. A stopper is arranged in the width range of the housing plate member and adapted to, when the operation unit is moved in the direction different from the slide direction of the slide plate member, lock the operation unit so that the slide plate member is prevented from being moved in the withdrawing direction and, when the operation unit is moved back to the initial position so that it is unlocked, allow the withdrawing movement of the slide plate member.

With the information processing medium mounted, the slide plate member of the ejection mechanism is locked by the stopper and the ejection operation cannot be effected unless the stopper is released.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate a presently preferred embodiment of the invention, and together with the general description given above and the detailed description of the preferred embodiment given below, serve to explain the principles of the invention.

FIG. 3 is a side view showing the connector device;

FIG. 4 is a front view showing the connector device;

DETAILED DESCRIPTION OF THE PREFERRED EMBODIMENT

An embodiment of the present invention will be explained below with reference to the accompanying drawings.

Figure 1:
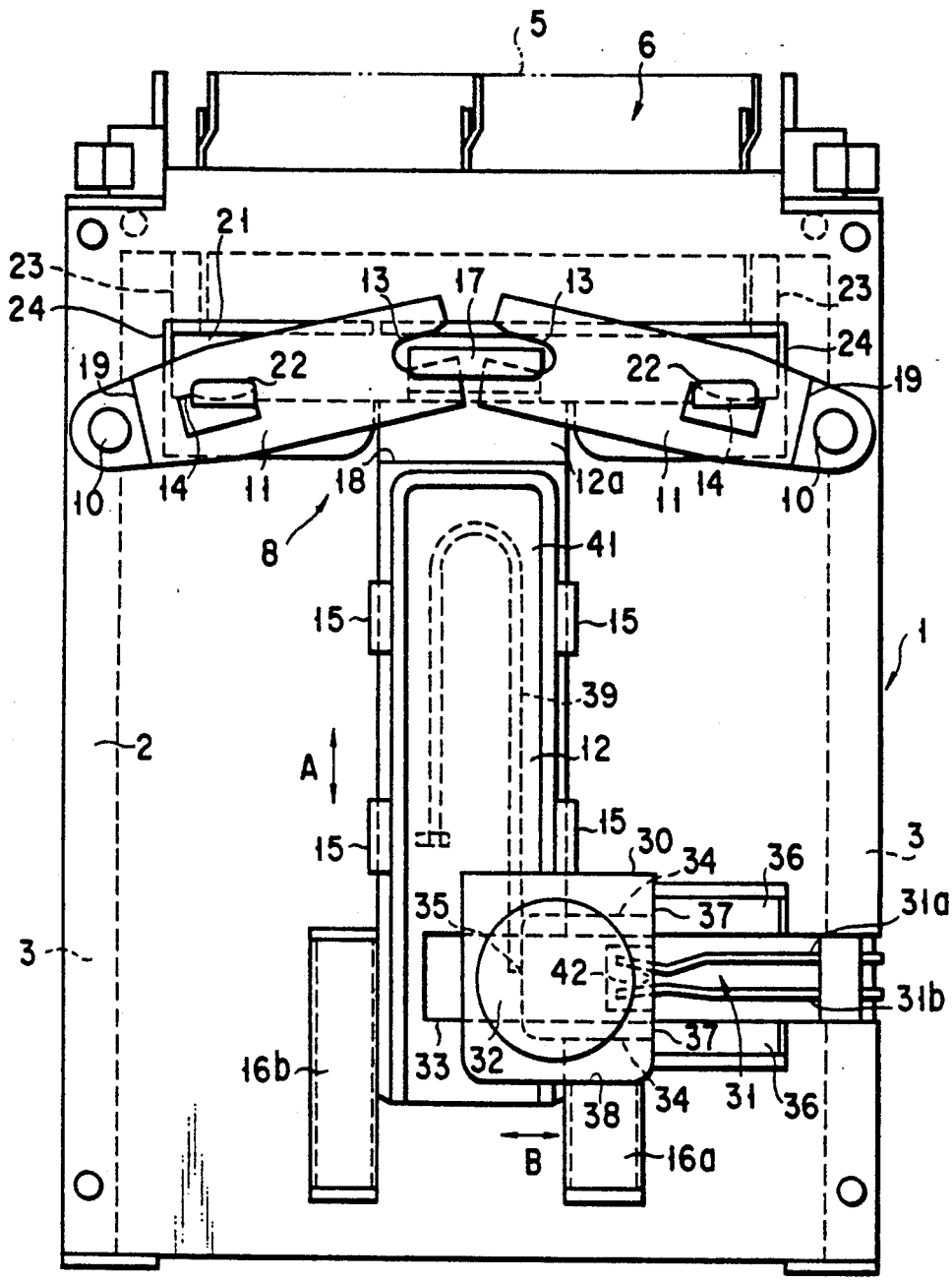
FIG. 1 is a bottom view showing a connector device according to an embodiment of the present invention.
Figure 2:
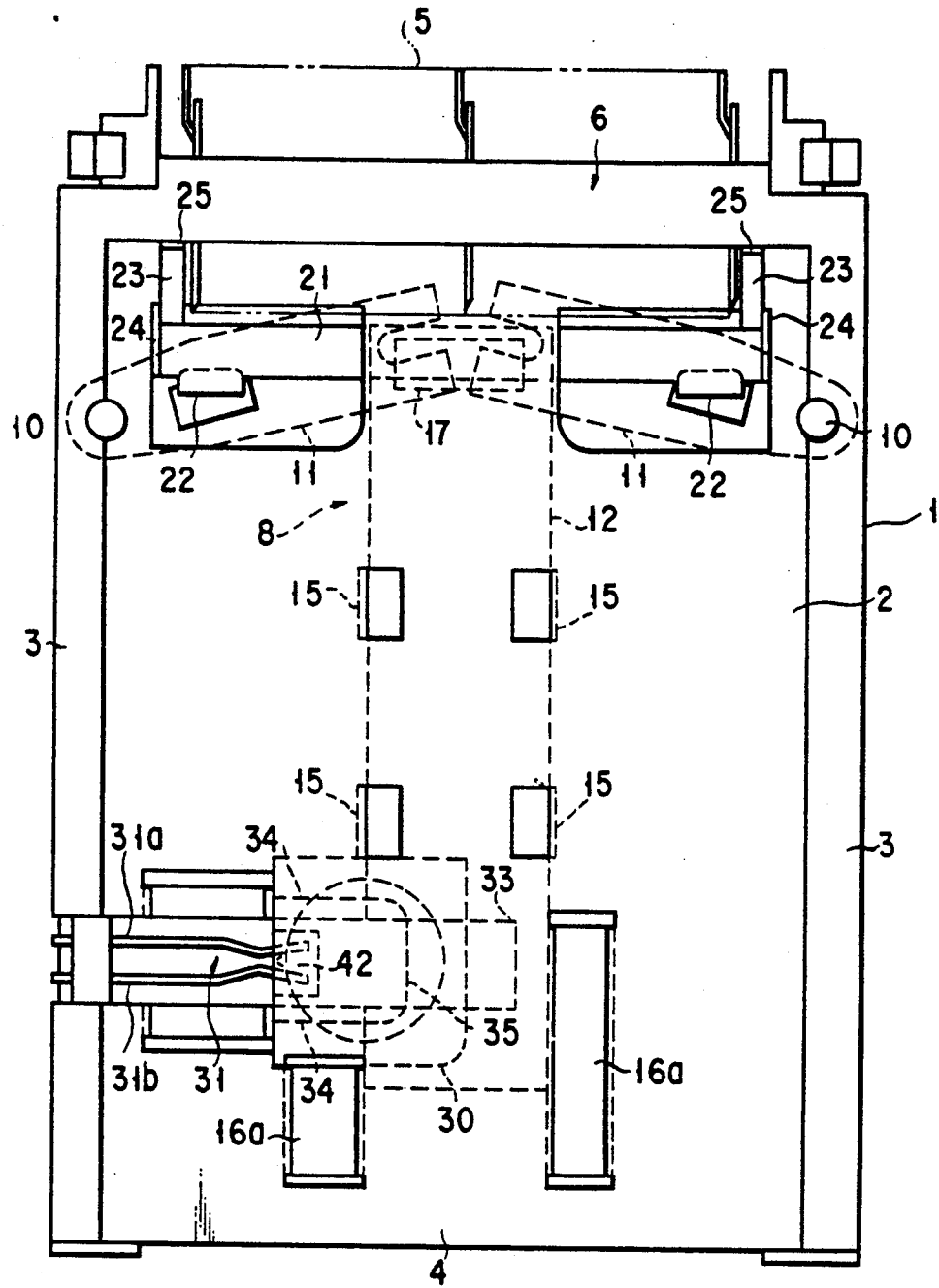
FIG. 2 is a top view showing a connector device of FIG. 1.
Figure 5:
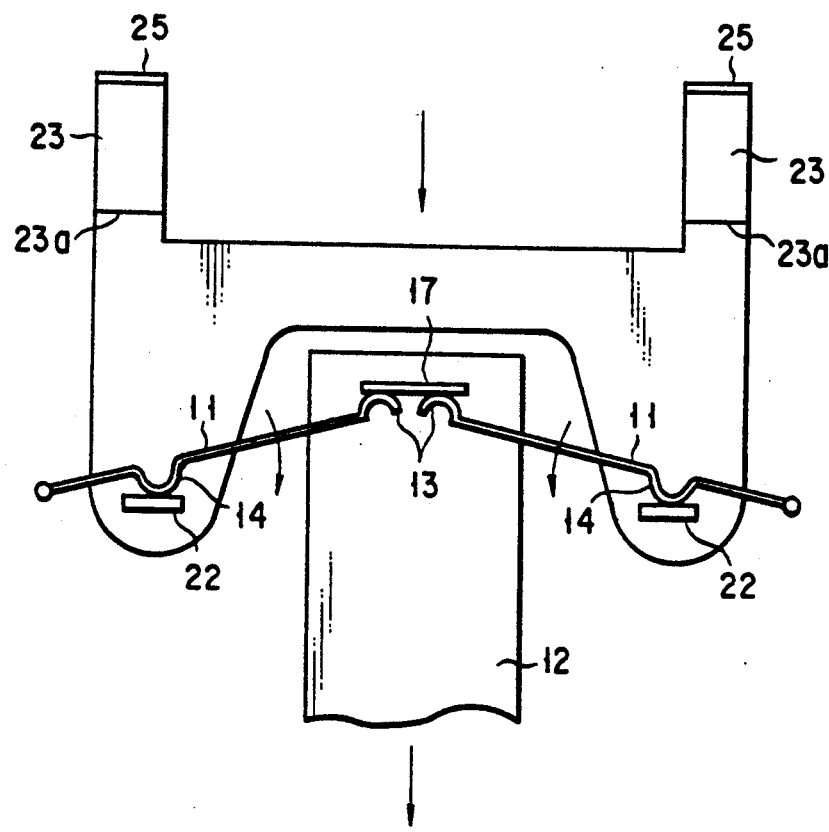
FIG. 5 is an explanative view showing an ejection mechanism in the connector device of the present invention.

FIG. 1 is a lower side view showing a connector device of the present invention. The connector device is mounted on a lower surface section of an electronic apparatus with the lower surface side down.

The connector device 1 has a housing plate member 2 made up of a flat plate-like metal. On the upper surface side of the housing plate member 2, a pair of guide frame members 3, 3 are placed in a parallel array in an opposed relation to the opposite side portions of the housing plate member 2 and have a width somewhat greater than that of an information processing medium (not shown), such as an IC pack, a length substantially equal to the depth of the IC pack and a thickness substantially equal to that of the IC pack. The pair of guide frame members guide the IC pack in an insertion/withdrawal direction.

At one end of the housing plate member 2 and on a side opposite to an insertion inlet side 4 where the IC pack is inserted, a connector section 6 is provided with a plurality of pin terminals 5 electrically connected to the socket terminals of the IC pack. Upon being mounted in a predetermined position in the electronic apparatus, the housing plate member 2 provides a space 7 relative to a circuit board of the electronic apparatus side with the pair of guide frame members 3, 3 interposed in which case the space 7 receives the IC pack. An ejection mechanism, etc., as will be set out below is incorporated, in as thin a form as possible, on the surface of the housing plate member 2.

As shown in FIG. 1, the ejection mechanism 8 of the connector device 1 includes a pair of metal ejection levers 11 having one end pivotally supported on the housing plate member 2. A rotation shaft 10 is located on a right-side of the housing plate member 2 to pivotally support one of these ejection levers. Another rotation shaft 12 is located on a left-side of the housing plate member 2 to pivotally support the other ejection lever 11. The pair of ejection levers 11 are symmetrically arranged relative to the housing plate member 2 such that they are in a mirror image relation to each other. The forward free ends of the injection levers 11 are symmetrically arranged in a manner to face each other at the middle of the housing plate member 2. A cutout 13 is formed, as a first connecting section, at the toward free end portion of the respective ejection lever 11 be latchingly connected to an engaging section of the slide plate member 12 as will be set out below. A second connection section is provided at the intermediate of the respectively ejection lever 11 and comprised of a tongue 14 provided at an edge portion of a struck-out hole.

The slide plate member 12 is made up of a substantially rectangular plate like metal member and disposed at the middle of the undersurface of the housing plate member 2 such that the longitudinal direction of the slide plate member 12 extends along a direction A in which the IC pack is inserted and withdrawn into and out of the space 7. The slide plate member 12 is so mounted that the IC pack is moved, while being in slide contact with the undersurface of the housing plate member 2, in the direction A in which the IC pack is inserted and withdrawn.

The slide plate member 12 is linearly guided in a predetermined direction, by hooks 15 and band-like slide guide (16a, 16b, without being displaced off their sides and housing plate member 2. It is to be noted that the band-like slide guide (16a, 16b) is somewhat raised from the housing plate member 2. The guide hook 15 is struck out of the surface portion of the housing plate member 2 and bent like a hook. The opposed guide hooks 15 guide the slide plate member 12 relative the surface of the housing plate member 2 with the side edges of the slide plate member 12 sandwiched between the opposed guide hooks 15. Further, the slide guides 16a, 16b guide the slide plate member 12 in a manner to sandwich it between the slide guides 16a, 16b. The guide hooks 15 may be provided, as a struck-out hooks, at the side edge portions of the housing plate member 2.

An engaging tongue 17 is provided, as a struck-out hook, at the far end portion of the slide plate member 12 and coupled to the cutouts 13 provided at the forward free end portion of the respective injection levers 11. That is, the slide plate member 12 is operated to move the respective ejection levers 11 simultaneously.

The slide plate member 12 is slidably moved along the undersurface of the housing plate member 2. A bent section 18 is provided just at the far end portion of the slide plate member 12 so as to provide a somewhat raised, offset step. A clearance is provided to allow the middle portion of a slipout plate 21 to pass between the far end portion 12a of the slide plate member 12 and the housing plate member 2 as will be set out below. The forward free end portions of the respective ejection levers 11 face each other in an overlapped relation relative to the housing plate member 2 at a location external to the far end portion 12a. A bent section 19 is provided, as an offset section, at the ejection lever 11 to provide a raised forward end portion. At that location, the housing plate member 2, slipout plate 21, slide plate member 12 and ejection lever 11 are sequentially arranged in that order in an overlapped relation and in a sliding relation to provide a small-thickness dimension.

The slipout plate 21 can withdraw the IC pack out of the pin terminals 5 of the connector section 6 and eject it from the connector area, noting that the slipout plate 21 is so provided as to be in contact with the undersurface of the housing plate member 2. Two engaging hooks 22 are provided as hook-like tongues on the slipout plate 21 and extend from a laterally symmetrical position on the insertion inlet 4 side of the slipout plate 21. The hooks 22 are engaged with associated tongue 14 of the ejection levers 11, respectively, to connect the ejection lever 11 to the slipout plate 21. In this embodiment, a distance from the pivotal point of the injection lever 11 to a slide plate member 12-to-slipout plate 21 connection point is set to be a ratio of 1:3 relative to the ejection lever 11. However, the ratio may be set to, for example, 1:2.

Arms 23 are provided one to the right and one to the left of the far end side of the slipout plate 21. The forward end of the arm 23 extends toward the upper end side of the housing plate member 2 via the cutout 24 in the housing plate member 2. The arm 23 has a bent section 23a formed partway in a manner to be offset relative to the slipout plate 21. By so doing, the respective arms 23 of the slipout plate 21 are in direct contact with the surface of the IC pack for grounding.

Hook-like engaging sections 25 are provided as bent sections on the forward ends of the arms 23 to engage with the socket side end faces at the front end face of the IC pack. The slipout plate 21 is moved by the ejection levers 11, while being in side contact with the lower surface of the housing plate member 2, in the direction in which the IC pack is inserted and withdrawn. By so doing, the IC pack is withdrawn out of engagement with the pin terminals 5 of the connector section 6 and ejected.

An operation unit 30 made of electrically insulating resin is mounted relative to the slide plate member 12 and adapted to allow the slide operation of the slide plate member 12 and to turn the so-called "interrup switch" contact 31 ON or OFF. The operation unit 30 has a recess 32 of user's finger tip size at its outer surface and a guide base 35 on the inner surface side. The guide base 35 has a guide groove 34 with which the side edges of a cutout 33 in the slide plate member 12 engage. That is, the cutout 33 is provided parallel to a B direction orthogonal to an A direction of the slide plate member 12 and serves as a guide at its parallel side edges to guide the operation unit 30 in the B direction.

When the operation unit 30 is moved by the aforementioned guide to the right in FIG. 1, it is shifted past a far end 38 of the slide guide 16a and abuts against one end 37 of a downwardly raised band-like plate section 36 of the housing plate member 2, thus preventing any further movement of the operation unit 30. The far end 38 of the slide guide 16a is so located as to be in proximity to, or in slide contact with, the side face of the operation unit 30. A stopper is provided by the far end 38 of the slide guide 16a so as to prevent the slide plate member 12 from being withdrawn out of the connector device when the operation unit 30 is moved by the guide to the right in FIG. 1.

When the operation unit 30 is retracted by the guide to the left in FIG. 1, it abuts against the side face of the other slide guide 16b, thus preventing any further side movement. With the operator unit 30 in the position, no stopper acts in the A direction in which the slide plate member 12 is withdrawn. Thus the slide plate member 12 can be slidably moved by the operation unit 30, noting that, in the depth direction, the operation unit 30 abuts against the right and left guide hooks 15 to prevent it from being further pushed.

In the arrangement shown, when the operation unit 30 is moved to the right in FIG. 1, it is placed, by the stopper, in a locked state and the slide plate member 12 cannot be slidably moved in the direction in which it is withdrawn out of the connector device. When the operation unit 30 is shifted to the left in FIG. 1, the slide plate member 12 can be moved by the operation unit 30 in the direction in which it is withdrawn out of the connector device.

A spring 39 is provided between the slide plate member 12 and the guide base 35 of the operation unit 30 and serves as an elastic member for urging the operation unit 30 in the direction in which it is moved to the right in FIG. 1. The spring 39 is held between a raised middle section 41 of the slide plate member 12 and the lower surface of the housing plate member 2.

The interrupt switch contact 31 is normally comprised of two contact pieces 31a, 31b and located relative to a slide center axis of the operation unit 30. A projection 42 is provided on the base 35 of the operation unit 30 and enters between the contact pieces 31a and 31b when the operation unit 30 is moved to the right in FIG. 1. Thus the OFF state is obtained when the operation unit 30 is moved rightward (FIG. 1) into a position between the contact pieces 31a and 31b and the ON state is obtained when leftward in FIG. 1.

In the connector device 1 thus arranged, when the IC pack is to be mounted on the electric apparatus, it is inserted via the insertion inlet 4 into the storage space 7 and the socket terminals of the IC pack are fitted over the corresponding pin terminals 5 of the connector section 6. During the insertion of the IC pack, the front end face of the IC pack engages with the hook 22 of the slipout plate 21 and pushes the slipout plate 21 toward the far end. Upon the advance of the slipout plate 21, the ejection levers 11 are rotated around their rotation shaft 10 and, at the same time, the slide plate member 12 connected to the ejection levers 11 is advanced while being pushed.

When this state is attained, the operation unit 30 is automatically moved rightward, under the influence of the spring 39, to a position shown in FIG. 1. That is, the operation unit 30 is locked by the stopper mechanism and, for this reason, the slipout plate 21 cannot be moved in the ejection direction. Therefore, it is possible to initially prevent the inadvertent ejection operation of the IC pack.

In the locked state, the projection 42 on the base 35 of the operator 30 enters into an area between the contact pieces 31a and 31b of the interrupt switch contact 31 to attain an OFF state. By so doing, a computer body recognizes a state in which data involved is read from a memory medium. That is, the interrupt switch performs its function.

When the IC pack is to be withdrawn from the connector device, the operation unit 30 is operated, by the user's finger, from below the electronic apparatus body and, by so doing, is shifted against the urging force of the spring 39 to the left in FIG. 1. This operation is intentionally made because it is done against the urging force of the spring 39. The operation unit 30 is located between the slide guides 16a and 16b and the locked state is released. With this state, the withdrawing operation can be conducted in the A direction at which time the projection 42 of the operation unit 30 is slipped out of the area between the contact pieces 31a and 31b of the contact 31 to achieve a turn-ON state. Thus the computer body recognizes it as a slipout state.

When the operator unit 30 is slidably moved toward the user, the slide plate member 12 is moved in a slide motion in the withdrawing direction and the slipout plate 21 is retracted back through the injection levers 11, enabling the IC pack to be ejected out of the connector device.

In the connector device 1 thus arranged, since the 1:3 relation is established relative to the distance from the pivotal shaft of the ejection lever 11 to a connection point between the slide plate member 12 and the slipout section 21, the action of a lever works there and hence the ejection operation can be effected lightly. The switch section and ejection mechanism 11, including the operator unit 30, are arranged within the width of the housing plate member 2, enabling the connector device to be dimentioned as a compact unit in the width direction. Further, the operation unit 30 is provided such that it is downwardly oriented. Therefore, it is possible to operate the connector device from below the bottom side of the associated apparatus with the connector device incorporated therein.

Although the present invention is particularly suitably for a laptop type personal computer, etc., it is not restricted to the arrangement of the present embodiment and various changes or modifications of the present invention can be made without departing from the sprit and scope of the present invention. For example, a single ejection lever may be employed instead. In this case, the ejection lever may be of such a length as to adequitely utilize the width of the housing plate member in which case a slide plate member is arranged in a manner to be shifted toward the rotatory forward free end side of the ejection lever. As the information processing medium for the connector device, use may be made of various types of memory cards, IC cards, floppy disks, hard discs, etc.

According to the present invention, as set out above a connector device for information processing medium can be provided which is relatively simple in construction, can be made compact in a width direction without particularly increasing the thickness per se of the connector device, and can be made in a form as near to an outer width/thickness dimension of the information processing medium per se as possible. It is possible for the user to know that data is now being read out of the information processing medium, such as the IC pack, attached to the connector device and to avoid an operation error, that is, a wrong operation for ejecting the information processing medium, to a minimum possible extent. There is also an added advantage, such as the ability to effect an ejection operation lightly.

Additional advantages and modifications will readily occur to those skilled in the art. Therefore, the invention in its broader aspects is not limited to the specific details, and representative devices, shown and described herein. Accordingly, various modifications may be made without departing from the spirit or scope of the general inventive concept as defined by the appended claims and their equivalents.

What is claimed is:

1. A connector device for an information processing medium, comprising:

a housing plate member having a insertion inlet where the information processing medium is inserted;

a pair of guide frame members arranged parallel to both opposed sides of the housing plate member and adapted to guide the information processing medium in a direction in which it is inserted and withdrawn, the pair of guide frame members having a distance substantially equal to a width of the information processing medium;

a connector section located at one end opposite to the insertion inlet of the housing plate member, the connector section having connection terminals electrically connected to the information processing medium;

a slipout plate member provided relative to the housing plate member and having an engaging section engaging with the information processing medium electrically connected to the connector section so that the medium can be withdrawn, the slipout plate member being slidably moved in the direction in which the information processing medium is inserted and withdrawn;

an ejection lever pivotally mounted on the housing plate member and having a first connection section at its free end portion and a second connection section at its intermediate portion, the second connection section being connectable to the slipout plate member;

a slide plate member having a guide area, the slide plate member slidably mounted on the housing plate member and coupled to the first connection section of the ejection lever;

an operation unit arranged in a width range of the housing plate member and connectable to be slidably moved along the guide area in the slide plate member in a direction different from that in which the slide plate member is slidably moved; and a stopper arranged in the width range of the housing plate member and adapted to, when the operation unit is moved in one direction, engage with the operation unit and prevent the slide plate member from being moved in the withdrawing direction and, when the operation unit is moved in the other direction, allow a movement in the direction of the withdrawing operation of the slide plate member.

2. The connector device according to claim 1, wherein the pair of ejection levers are provided in place of said ejection lever, one of these ejection levers having a pivotal point located on one side of the housing plate-member and the other ejection lever having the other side of the housing plate member, and the free ends of the respectively ejection levers are located in the neighborhood of a middle of the housing plate member and the slide plate member is located in the neighborhood of the width of the housing plate member.

3. The connector device according to claim 1, wherein the guide is comprised of a cutout in the slide plate member which has parallel edges along a direction perpendicular to a slide direction of the slide plate member and a groove in the operation unit slidably engage with the edges of the cutout.

4. The connector device according to claim 1, further comprising an urging member for moving the operation unit toward the stopper in a locked relation when the information processing medium is inserted into the connector device via the insertion inlet so that it is connected to the connector section.

5. The connector device according to claim 1, further comprising a connection state detection switch which is operated by the operation unit when the stopper is locked.

6. The connector device according to claim 5, wherein the switch is locked in the width range of the housing plate member.

* * * * *